United States Patent
Corsini et al.

(10) Patent No.: US 11,262,712 B2
(45) Date of Patent: Mar. 1, 2022

(54) METHOD AND SYSTEM FOR COLLECTING DATA FROM A DATA-SOURCE INTO A MOM DATA WAREHOUSE

(71) Applicant: SIEMENS AKTIENGESELLSCHAFT, Munich (DE)

(72) Inventors: Giorgio Corsini, Genoa (IT); Giuliano Trifoglio, Genua (IT)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 16/253,632

(22) Filed: Jan. 22, 2019

(65) Prior Publication Data

US 2019/0227503 A1 Jul. 25, 2019

(30) Foreign Application Priority Data

Jan. 19, 2018 (EP) ..................... 18152568

(51) Int. Cl.
| | |
|---|---|
| *G06F 16/28* | (2019.01) |
| *G05B 13/04* | (2006.01) |
| *G06Q 10/06* | (2012.01) |
| *G06F 16/25* | (2019.01) |
| *G05B 17/02* | (2006.01) |
| *G05B 19/418* | (2006.01) |
| *G06N 5/02* | (2006.01) |

(52) U.S. Cl.
CPC ........... *G05B 13/042* (2013.01); *G05B 17/02* (2013.01); *G05B 19/4183* (2013.01); *G05B 19/41875* (2013.01); *G06F 16/258* (2019.01); *G06F 16/283* (2019.01); *G06N 5/022* (2013.01); *G06Q 10/0639* (2013.01); *G05B 2219/34351* (2013.01)

(58) Field of Classification Search
None
See application file for complete search history.

(56) References Cited

U.S. PATENT DOCUMENTS

| | | |
|---|---|---|
| 2011/0302554 A1 | 12/2011 | Rivas et al. |
| 2014/0095254 A1 | 4/2014 | Chauhan et al. |
| 2014/0337429 A1* | 11/2014 | Asenjo ............... G06Q 10/0637 709/204 |
| 2018/0293597 A1* | 10/2018 | Koese .................. G06F 16/252 |

FOREIGN PATENT DOCUMENTS

WO 2016165923 A1 10/2016

* cited by examiner

*Primary Examiner* — Giuseppi Giuliani
(74) *Attorney, Agent, or Firm* — Laurence A. Greenberg; Werner H. Stemer; Ralph E. Locher

(57) ABSTRACT

A process and a system collect data from a data-source into a manufacturing operation management (MOM) data warehouse. The data in the MOM data-warehouse are exposed according to a basic data model in which a performance parameter is linked to a basic set of context identifiers for MOM analysis purposes. The data in the data source are exposed according to a source data model in which a source performance parameter is linked to a source set of context identifiers. A data extensor module is provided for processing the data received from the data source to add, upon need, a context identifier linked to the source performance parameter. Whereby the added context identifier is present in the basic set but it is not present in the source set. The data extensor module processing data is received from the data source to obtain augmented data stored in the MOM data warehouse.

6 Claims, 2 Drawing Sheets

METHOD AND SYSTEM FOR COLLECTING DATA FROM A DATA-SOURCE INTO A MOM DATA WAREHOUSE

CROSS-REFERENCE TO RELATED APPLICATION

This application claims the priority, under 35 U.S.C. § 119, of European application EP 18152568.4, filed Jan. 19, 2018; the prior application is herewith incorporated by reference in its entirety.

BACKGROUND OF THE INVENTION

Field of the Invention

The present invention relates to a method and to a system for collecting data from a data-source into a MOM data warehouse.

Particularly interesting examples of industrial software to which the present invention can be applied are manufacturing execution systems (MES) and manufacturing operation management (MOM) systems. Most recently, the term MOM is more and more used to replace the term MES.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens AG offers a broad range of MES/MOM products under its SIMATIC® IT product family.

In order to support business decision making, data warehouses collect subject oriented data to make analysis on a particular subject area. Usually, the data warehouse combines information from several sources into one comprehensive database.

In the domain of manufacturing data analysis, MOM data warehouses support business decisions by collecting data from multiple MOM data sources, e.g. like data of sensors and equipment controllers, and then by consolidating and organizing the collected data for reporting and analysis purposes.

Therefore, MOM data warehouses are typically structured with a common MOM Analytical Data Model, where the MOM analytical data model is a unique and common model for the MOM users in order to improve the data warehouse usability and deliver the users basic requirements.

Herein, the term basic data model is interchangeably denoting the MOM Analytical Data model of the MOM data warehouse.

A typical MOM Analytical Data Model usually exposes performance parameters with the measures that are considered relevant for the analysis of manufacturing performances linked to context indicators representing the perspective for analyzing such performance parameters. Examples of MOM performance parameters include, but are not limited to, temperature, scraps and energy consumption. Examples of MOM context indicators include, but are not limited to, time, equipment and production order.

In typically MOM scenarios, it is often the case that not all the MOM data sources share the same data model. Additionally, it is often the case that not every performance parameter is linked to the same set of production contexts.

FIG. 1 is a diagram schematically illustrating a data model of a MOM data warehouse 101 and a data model of a data source. In the MOM data warehouse 101, data are organized in a basic data model 103, instead the data of a data source 102 have a source data model 104 different from the basic data model 103.

In fact, within the basic data model 103, the exposed performance parameter PP_a is linked to three context indicators CI_1, CI_2 and CI_3; while, within the source data model 104, the exposed data performance parameter PP_b is only linked to two context indicators CI_1, CI_2, and the third context indicator is therefore missing.

In such a MOM scenario, the user would rather have, also for the imported measure PP_b, the third context indicator CI_3 beside the already present context indicators CI_1, CI_2. For example, a MOM user would like to know the quantity of scraps for each production order on a given equipment at a given time since she/he desires to evaluate for each measure PP_a, PP_b (e.g. energy consumption, scraps) all the three basic context indicators CI_1, CI_2, CI_3 (e.g. time, equipment and production order) he/she is usually working with.

Unfortunately, such scenarios, where the basic data model differs from the source data models, limit the analysis capabilities of the end-users who are then unable to apply the same contextualization to all performance measures available into the MOM data warehouse.

In manufacturing data analysis such problem has until now been solved with two approaches. The first approach is an "a-priori" one and the second approach is "a-posteriori" one.

According to the first "a-priori" approach, the link to the missing contexts in the MOM data warehouse is performed at a product level. This approach is typically used in case of a general purpose data warehouse design, where the data models of all relevant MOM data sources are known in advance. Hence the calculation of the extensions is done, within the system, in a built-in manner, where the user might even be unaware of it.

A major drawback of such approach is that the MOM data warehouse cannot be extended with any external data source and/or any legacy systems.

According to the second approach, the link to the missing contexts in the MOM Data warehouse is performed at a solution level. This approach is typically used by software architects in case of a data warehouse design which is customer specific, where usually the architect is writing specific software code for the specific design required by the specific customer.

A major drawback of such approach is that the MOM Data warehouse structure is strictly dependent on the specific architectural design decisions of the software architect.

In both approaches software skills are required.

SUMMARY OF THE INVENTION

It is therefore the aim of the present invention to overcome the above mentioned drawbacks, in particular by providing a method and a system for collecting data from a data-source into a MOM data warehouse which renders the data model of the data source uniform to the data model of the warehouse in an improved manner.

The aforementioned aim is achieved by a process and a system for collecting data from a data-source into a MOM data warehouse, wherein data in the MOM data-warehouse are exposed according to a basic data model where a performance parameter is linked to a basic set of corresponding context identifiers for MOM analysis purposes. The data in the data source are exposed according to a source data model where a source performance parameter is linked to a source set of corresponding context identifiers; containing:

a) providing a data extensor module for processing the data received from the data source in order to add, upon need, a context identifier linked to the source performance parameter, whereby the added context identifier is present in the basic set but it is not present in the source set;

b) by the data extensor module, processing data received from the data source to obtain augmented data, where the augmented data are exposed in an extended data model compatible with the basic data model; and c) collecting the augmented data into the data-warehouse.

In embodiments, the processing by the data extensor module may preferably contain: generating an additional source performance parameter; and, estimating the value of the additional source parameter by adapting the value of the source performance parameter to the linked added context identifier. In embodiments, the value estimation may preferably be performed by a numeric distribution technique or by a weighted distribution technique taking into account another performance parameter.

In embodiments, the data extensor module may conveniently be configurable via a User Interface.

In embodiments, the context identifiers of the source set may preferably contain at least one among time and equipment identifiers.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Embodiments render the two data models compatible by adding relevant context identifiers to the data of the data source.

Embodiments enable to make consistent analysis on differently collected data, even when stemming from data sources having a different type of data model.

Embodiments enable users to proceed with the analysis of production data with a homogeneous set of production contexts.

Embodiments extend the analytical capabilities in a MOM data warehouse.

Embodiments enable extensions to the analytical model of the MOM data warehouse without the need of redefining context links to added measures.

Embodiments advantageously enable users to integrate data provided by external and/or legacy system in the MOM data Warehouse through configuration only activities.

Embodiments advantageously enable MOM data warehouses to easily scale up by seamlessly including new data sources.

The invention will now be described in preferred but not exclusive embodiments with reference to the accompanying drawings, wherein:

Other features which are considered as characteristic for the invention are set forth in the appended claims.

Although the invention is illustrated and described herein as embodied in collecting data from a data-source into a MOM data warehouse, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

At least some embodiments of the present invention address the above described issue in which a method and a system collect data from a data-source and put the data into a MOM data warehouse.

Figure 1:
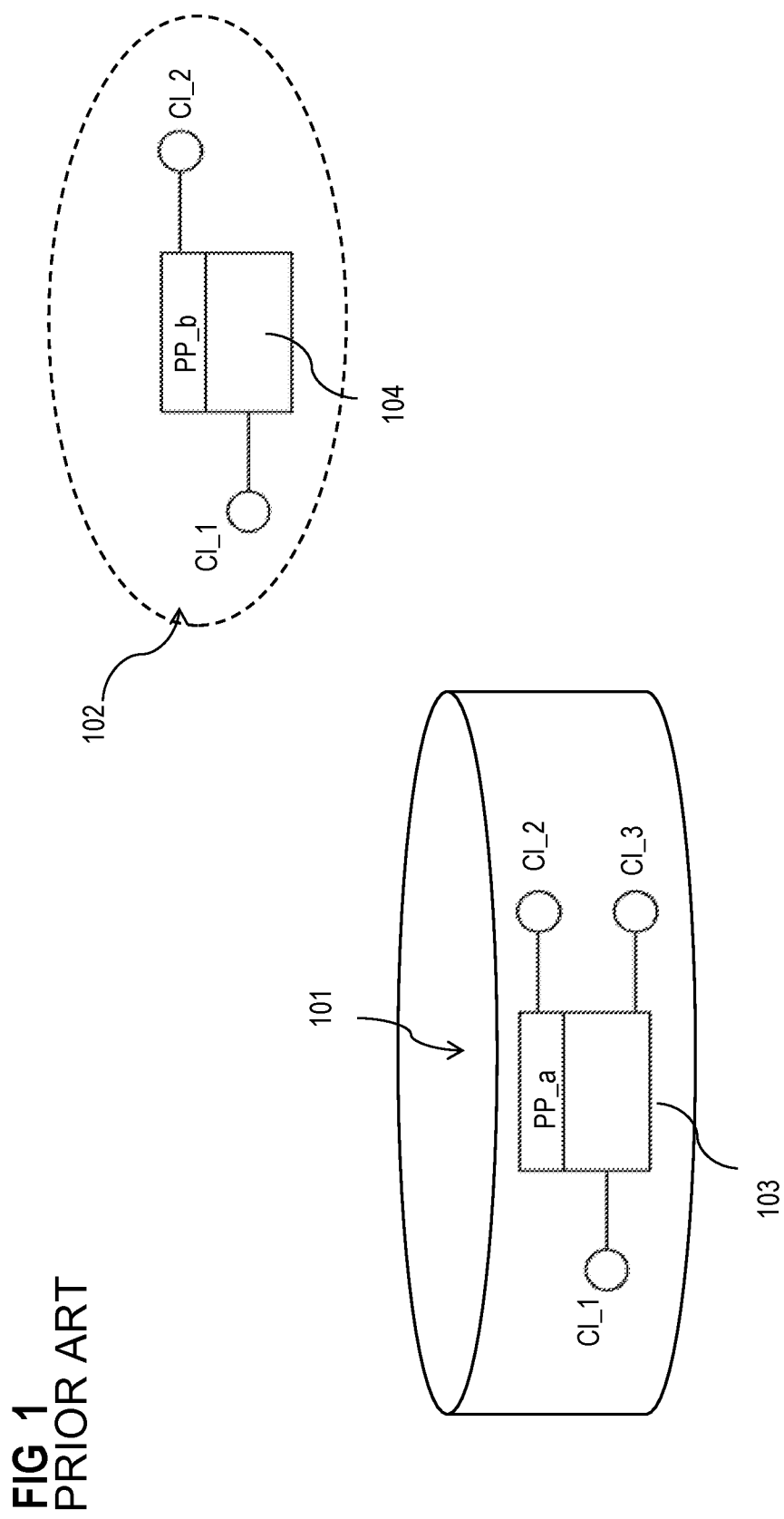
FIG. 1 is a diagram schematically illustrating a data model of a MOM data warehouse and a data model of a data source according to the prior art.
Figure 2:
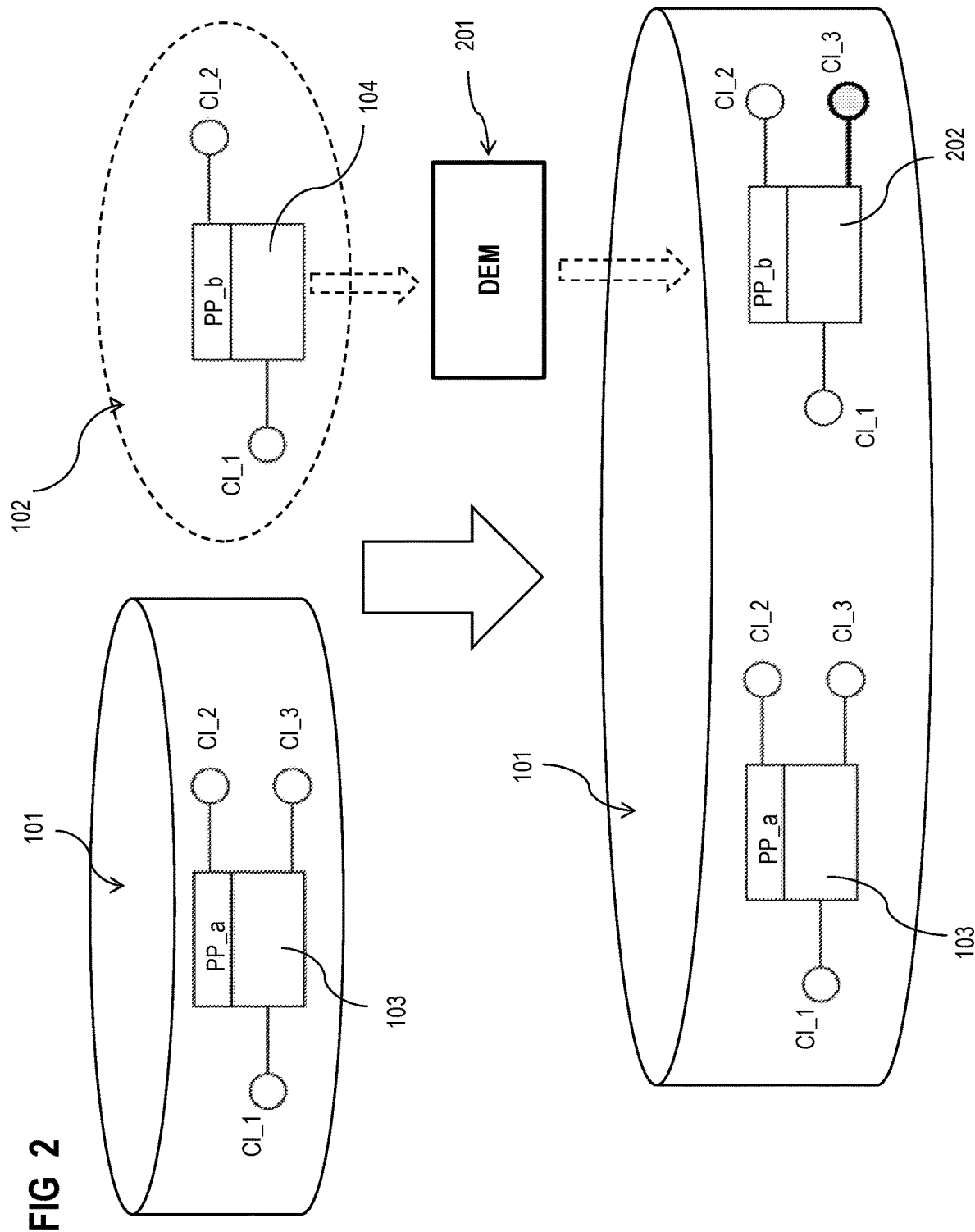
FIG. 2 is a diagram schematically illustrating data collection into the MOM data warehouse from the data source according to an example embodiment of the present invention.

Referring now to the figures of the drawings in detail and first, particularly to FIG. 2 thereof, there is shown a diagram schematically illustrating data collection from a data source according to an example embodiment of the present invention. The data in the MOM data-warehouse 101 are exposed according to a basic data model 103 where a performance parameter PP_a is linked to a basic set of corresponding context identifiers CI_1, CI_2, CI3 for MOM analysis purposes. The data in the data source 102 are exposed according to a source data model 104 where a source performance parameter PP_b is linked to a source set of corresponding context identifiers CI_1, CI_2.

A data extensor module 201 is provided for processing the data received from the data source 102 in order to add, upon need, a context identifier CI_3 linked to the source performance parameter PP_b, whereby the added context identifier CI_3 is present in the basic set but it is not present in the source set.

The data extensor module 201 processes the data received from the data source 102 to obtain augmented data, where the augmented data are exposed in an extended data model 202 compatible with the basic data model 103. The augmented data are then collected into the data-warehouse 101.

Advantageously, it is possible to collect the performance parameter PP_b of the data source 102 within the MOM data warehouse 101 and link it to the previously missing context identifier CI_3. As used herein the term "augmentation" indicates that data may be extended and processed since some of the original data might be modified to obtain an estimate of them.

For example, assume that the source data come from a given sensor on given equipment where the sensor is measuring temperature over time. The context of the equipment could easily be inferred by knowing the sensor name and its location but the production order information, eventual useful to the user, would then still be missing. Advantageously, with embodiments, it is possible to add the context production order to the measures of the sensor which are time and temperature.

Example of Algorithm Embodiment

In several shop floor systems, at least one context identifier (time or equipment) is usually available for every performance parameter that is imported in the MOM data warehouse. In this example assume that both context identifiers time and equipment are available in the MOM data sources.

An exemplary algorithm embodiment includes the following steps:

a) the user selects a new MOM data source;
b) the user selects from the available performance parameters and context identifier of the selected MOM data source, the performance parameter and the linked context identifiers relevant for the desired target analysis, in this case:
c) the user selects an additional context identifier—available in the basic data model of the MOM data warehouse but not in the data model of the MOM data source;
d) the system loads the selected data from the MOM data source and calculates for each time-equipment pair:
d1) all the N-tuple listing the N context identifiers, where N is the number of distinct contexts in the MOM data warehouse and the new MOM data source (where N is bigger than 2); and
d2) all the M-tuple listing the M measures, using an augmenting processing engine, where M is number of performance parameters in the MOM data warehouse and in the new MOM data source.

The augmenting processing engine calculates the estimated augmented values according to an estimation criterion, preferably selected by the user.

A first example of user estimation criterion may for example be a numeric distribution approach, whereby the augmented values are calculated using a linear distribution technique.

A second example of user estimation criterion may for example be a weighted distribution approach, where by the augmented values are calculated according to the values of another reference performance parameter.

Examples Illustrating the Numeric and Distribution Approaches

Assume that the MOM data warehouse is configured to collect data from a MES system providing as a performance parameter, energy consumption measures contextualized with the production order. With this configuration, conveniently, the user can analyze the energy consumption for each production order, and compare it for each equipment piece in the plant and at any time period, like e.g. shifts and working weeks.

Assume that the production line of this plant is upgraded with a new MOM data source, which could be a hardware or software one, for example providing scraps quantities that have been generated by the equipment in the production line. Assume that this new data source does not contain any information related to the production order but nonetheless the user wishes to know the quantity of scraps produced for a specific production order.

With embodiments, the user is conveniently enabled to import the data from the new data source into the MOM data warehouse and link it to the existing contexts, including the production order which is the context identifier not provided by this data source. Hence, conveniently, with embodiments, the user has the possibility to query the MOM data warehouse and get the scraps quantity for a specific production order as desired.

This case is exemplified with Tables 1-4 illustrated below.

TABLE 1 existing data in the MOM data warehouse

| Context "time" | Context "equipment" | Context "order" | Measure "energy consumption" |
|---|---|---|---|
| t1 | Eq1 | OrdYY1 | 120 |
| t1 | Eq1 | OrdYY2 | 80 |
| t1 | Eq2 | OrdYY2 | 70 |
| t2 | Eq1 | OrdYY1 | 120 |
| t2 | Eq2 | OrdYY2 | 90 |
| t2 | Eq2 | OrdYY3 | 30 |

TABLE 2 data from the new data source

| Context "time" | Context "equipment" | Measure "scraps" |
|---|---|---|
| t1 | Eq1 | 10 |
| t1 | Eq2 | 6 |
| t2 | Eq1 | 8 |
| t2 | Eq2 | 12 |

TABLE 3 augmented data collected in the MOM data warehouse with the numeric distribution technique approach.

| Context "time" | Context "equipment" | Context "order" | Measure "energy consumption" | Estimated Measure "scraps" | (Real Measure "scraps") |
|---|---|---|---|---|---|
| t1 | Eq1 | OrdYY1 | 120 | 5 | (10) |
| t1 | Eq1 | OrdYY2 | 80 | 5 | (10) |
| t1 | Eq2 | OrdYY2 | 70 | 6 | (6) |
| t2 | Eq1 | OrdYY1 | 120 | 8 | (8) |
| t2 | Eq2 | OrdYY2 | 90 | 6 | (12) |
| t2 | Eq2 | OrdYY3 | 30 | 6 | (12) |

TABLE 4 augmented data collected in the MOM data warehouse with the weighted distribution technique approach.

| Context "time" | Context "equipment" | Context "order" | Measure "energy consumption" | Estimated Measure "scraps" | (Real Measure "scraps") |
|---|---|---|---|---|---|
| t1 | Eq1 | OrdYY1 | 120 | 6 | (10) |
| t1 | Eq1 | OrdYY2 | 80 | 4 | (10) |
| t1 | Eq2 | OrdYY2 | 70 | 6 | (6) |
| t2 | Eq1 | OrdYY1 | 120 | 8 | (8) |
| t2 | Eq2 | OrdYY2 | 90 | 9 | (12) |
| t2 | Eq2 | OrdYY3 | 30 | 3 | (12) |

Table 1 shows the exisiting data in the MOM data warehouse. Such data includes the performance parameter, hereby also called measure, "energy consumption" linked to its corresponding context identifiers "time", "equipment"

and "order". Hence, as illustrated in Table 1, the basic data model of the MOM data warehouse includes three different context identifiers time, equipment and order.

Table 2 shows data stemming from the new MOM data source. Such data includes the "scraps" measure linked to its corresponding context identifiers "time" and "equipment". As seen in Table 2, the model of this source data does not contain the context identifier "order" that is present in the basic model of the MOM data warehouse.

Table 3 and Table 4 show the augmented data collected in the MOM data warehouse resulting from the processing of the measured source data real "scraps" by the data extensor module in order to obtain estimated "scraps" (column 5) by linked to the added context identifier "order".

The values of the estimated "scraps" (column 5) of Table 3 are calculated with a numeric distribution technique and the values of the estimated "scraps" (column 5) of Table 4 are calculated with a weighted distribution technique where the energy consumption measured values are used to weigh the real scraps to calculate the estimated scraps to be associated to each production order.

In this first specific example embodiment of Table 3, scraps are equally distributed between the production orders executed on the same equipment. More in details:
a) at time t1 for the equipment Eq1 there are two orders executed, OrdYY1 and OrdYY2, the measured scraps 10 (column 6) are devided equally for the two orders in 5 and 5 (see estimated measure scraps, column 5);
b) at time t1 for the equipment Eq2, only order OrdYY2 is executed, therefore the measured real "scraps" 6 of column 6 is reported unchanged into the estimated value of column 5;
c) at time t2 for the equipment Eq1, only order OrdYY1 is executed, therefore the measured real "scraps" 8 of column 6 is reported unchanged into the estimated value of column 5;
d) at time t2 for the equipment Eq2 there are two orders executed, OrdYY2 and OrdYY3, the measured real "scraps" 12 of column 6 are devided equally for the two orders in 6 and 6 (see estimated measure scraps, column 5).

In this second specific example embodiment of Table 4, scraps are distributed between the production orders executed on the same equipment by taking into account the weight provided by the values of the column "energy consumption" (column 4). More in details:
a) at time t1 for the equipment Eq1 there are two orders executed, OrdYY1 and OrdYY2, the measured scraps 10 (column 6) are distributed by the weight provided by the energy consumption values of column 6, 120 and 80, resulting then in 6 and 4 of the estimated measure scraps values of column 5;
b) at time t1 for the equipment Eq2, only order OrdYY2 is executed, therefore the measured real "scraps" 6 of column 6 is reported unchanged into the estimated value of column 5;
c) at time t2 for the equipment Eq1, only order OrdYY1 is executed, therefore the measured real "scraps" 8 of column 6 is reported unchanged into the estimated value of column 5;
d) at time t2 for the equipment Eq2 there are two orders executed, OrdYY2 and OrdYY3, the measured scraps 12 (column 6) are distributed by the weight provided by the energy consumption values of column 6, 90 and 30, resulting then in 9 and 3 of the estimated measure scraps values of column 5.

Advantageously, in embodiments, both examples of Tables 3 and 4, the MOM data warehouse stores both the "original" real imported values of column 6 and the "augmented" estimated values of column 5, thus preserving the complete knowledge of the system, so that the user can query the MOM data warehouse and get the original or augmented values, according to his desired target analysis.

Advantageously, in embodiments, the user chooses which criterion, e.g. numeric distribution or weighted distribution with a reference parameter, to be used by the augmenting processing engine for calculating the estimated augmented values.

In embodiments, the skilled in the art will easily appreciates that it is possible to define in a custom manner other types of estimation criteria for the augmenting processing.

Advantageously, in embodiments, when data from new MOM data sources are imported in the MOM data warehouse, estimated measure values are associated to the imported real measure values and additional context identifiers are rendered available for linking which were originally not included in the MOM data source. Advantageously, in embodiments, the missing added context identifiers are added with a configurational approach without the need to write custom code. Hence, the possibility to create a "link" between database context identifiers and added measures is built in the system thanks to a pre-written core augmenting algorithm, without the need to develop a custom program.

In embodiments, the data extensor module is configurable by the user via a User Interface.

In embodiments, the data extensor module comprises an engine that applies the user selections as regards estimation criteria and/or parameters and context indicators to add. In embodiments, the engine is available with the product.

In embodiments, the module understands what are the missing context indicators and proposes them to the users that accepts them or not.

The invention claimed is:

1. A method for collecting data from a data-source into a manufacturing operation management (MOM) data warehouse, wherein data in the MOM data-warehouse are exposed according to a basic data model in which a performance parameter is linked to a basic set of corresponding context identifiers for MOM analysis purposes, the data in the data source are exposed according to a source data model in which a source performance parameter is linked to a source set of corresponding context identifiers, which comprises the following steps of:

providing a data extensor module executed by a processor of a computing device, the processor configured by the data extensor module for processing the data received from the data-source in order to add, upon need, a context identifier linked to the source performance parameter, whereby an added context identifier is present in the basic set but the added context identifier is not present in the source set;

processing, in the data extensor module, the data received from the data source to obtain augmented data, the augmented data are exposed in an extended data model compatible with the basic data model;

the processing step including the further steps of:
generating an additional source performance parameter; and
estimating a value of the additional source parameter by adapting a value of the source performance parameter to a linked added context identifier.
wherein a user chooses which criterion is used for estimating the value of the additional source parameter, the user choosing one of a numeric distribution technique or a weighted distribution technique taking into account another performance parameter; and collecting the augmented data into the MOM data-warehouse.

2. The method according to claim 1, which further comprises configuring the data extensor module using a user interface.

3. The method according to claim 1, wherein the context identifiers of the source set contains at least one of time identifiers or equipment identifiers.

4. A system for collecting data from a data-source into a manufacturing operation management (MOM) data warehouse, wherein data in the MOM data-warehouse are exposed according to a basic data model in which a performance parameter is linked to a basic set of corresponding context identifiers for MOM analysis purposes, the data in the data source are exposed according to a source data model in which a source performance parameter is linked to a source set of corresponding context identifiers, the system comprising:

a data extensor module executed by a processor of a computing device, the processor configured by the data extensor module for processing the data received from the data source in order to add, upon need, a context identifier linked to the source performance parameter, whereby an added context identifier is present in the basic set but it is not present in the source set, said said processor configured by the data extensor module for processing the data received from the data source to obtain augmented data, where the augmented data are exposed in an extended data model compatible with the basic data model; and said data extensor module further configuring the processor to:

generate an additional source performance parameter; and estimate a value of the additional source parameter by adapting a value of the source performance parameter to a linked added context identifier, wherein a user chooses which criterion is used for estimating the value of the additional source parameter, the user choosing one of a numeric distribution technique or a weighted distribution technique taking into account another performance parameter:

means for collecting the augmented data into the MOM data-warehouse.

5. The system according to claim 4, wherein said data extensor module is configurable via a user interface.

6. The system according to claim 4, wherein the context identifiers of the source set contains at least one of time identifiers or equipment identifiers.

* * * * *